United States Patent [19]

Ogawa et al.

[11] Patent Number: 5,765,052
[45] Date of Patent: Jun. 9, 1998

[54] CAMERA WITH PLURALITY OF CAMERA MODES AND METHODS

[75] Inventors: Hidehiro Ogawa; Kazuharu Imafuji; Toru Kosaka, all of Kanagawa-ken, Japan

[73] Assignee: Nikon Corporation, Tokyo, Japan

[21] Appl. No.: 791,492

[22] Filed: Jan. 27, 1997

Related U.S. Application Data

[63] Continuation of Ser. No. 419,551, Apr. 10, 1995, abandoned.

[30] Foreign Application Priority Data

Apr. 22, 1994 [JP] Japan .................. 6-084839
Apr. 28, 1994 [JP] Japan .................. 6-092052

[51] Int. Cl.$^6$ .................................. G03B 15/05
[52] U.S. Cl. ................ 396/89; 396/80; 396/137
[58] Field of Search ................... 396/79, 80, 89, 396/96, 137

[56] References Cited

U.S. PATENT DOCUMENTS

| | | | |
|---|---|---|---|
| 4,595,990 | 6/1986 | Garwin et al. | 364/518 |
| 4,857,951 | 8/1989 | Nakajima et al. | 354/400 |
| 4,950,069 | 8/1990 | Hutchinson . | |
| 4,973,149 | 11/1990 | Hutchinson | 351/210 |
| 5,335,035 | 8/1994 | Maeda | 354/219 |
| 5,341,181 | 8/1994 | Godard | 351/210 |

FOREIGN PATENT DOCUMENTS 1-241511  9/1989  Japan .

Primary Examiner—Daniel P. Malley
Attorney, Agent, or Firm—Oliff & Berridge, PLC

[57] ABSTRACT

The operating mode contents of a camera can easily be set by the visual alignment action of the photographer and by manual operation. In a first embodiment, a camera is equipped with a visual line position detection device that detects the position of the visual line of the photographer, a mode contents setting device that sets the contents of the operating modes, and a control device that, when it is determined from the output of the visual line position detection device that the photographer is aligning his vision on a predetermined area, changes the camera mode of the mode contents setting device. In a second embodiment, it is possible to quickly switch the camera mode that is the object of manual operation to the object of the visual alignment operation. It is then possible to change the contents of the mode through the visual alignment action, constituting the manual operation in the second embodiment. A selection device is started through the operation of an operation device, such as a mode switching device, and accomplishes a process wherein the camera mode set through manual operation using a mode setting device is set as the camera mode that is the object of contents changing through the action of visual alignment on numerical value setting areas.

27 Claims, 12 Drawing Sheets

CAMERA WITH PLURALITY OF CAMERA MODES AND METHODS

This is a Continuation of application Ser. No. 08/419,551 filed Apr. 10, 1995 now abandoned.

BACKGROUND OF THE INVENTION

1. Field of the Invention

The present invention relates to cameras having a plurality of camera modes, wherein it is possible to designate an operating mode through a vision alignment operation and manual operation and to set the contents of the designated operating mode.

2. Description of Related Art

Through the development of recent electronics-related technology, cameras have many functions. Photography can be accomplished by selecting the appropriate functions from among the many functions according to the photographic objective and the wishes of the photographer.

In order to accommodate function selection, the structure of the cameras has become such that mode setting structure capable of setting the operating modes is positioned on the top or back surfaces or the like of the camera bodies in positions from which this setting structure can be easily operated by hand. Command dials for changing the set mode content are also provided in similar positions.

The command dials can be, for example, dial-type switches with which it is possible to increase or decrease the contents value of the set mode according to the direction of rotation.

With this type of conventional camera, in actually setting the contents of the operating modes, when the mode setting device comprises a button, for example, the photographer rotates the command dial while depressing the button, operating the dial so that the operating mode contents are changed to the desired contents.

Examples of the above-mentioned mode settings are exposure mode settings, photo metering mode settings, focus area settings, exposure compensation amount settings, and the like.

As described above, the operating mode selected from among the various exposure modes depends on operation of the mode setting device, which is accomplished according to the will of the photographer. Changes to the setting contents of the selected mode are also accomplished according to the will of the photographer through the operation of the command dial.

For example, when setting shutter priority auto as the operating mode, the command dial is rotated while the button is depressed, which constitutes the mode setting device. After selection, the button is released, and the shutter speed can be changed by operating only the command dial.

Other values that can be set, for example, settings of the contents of exposure compensation values and the like, are accomplished in the same manner.

As stated above, on recent cameras, photographers are provided with high performance cameras with many various functions. However, the selection branches become so many that it is not easy to swiftly and accurately select the desired functions.

In particular, when the photographer considers the photographic conditions while peering through the finder so as not to miss a "shutter chance," with the conventional camera described above, the ease of operation by the photographer is severely limited.

For example, when exposure compensation is accomplished during photography, since the photographer must, in actuality, operate the mode setting device by hand, depress the exposure compensation button that designates the exposure compensation mode, and operate the command dial by hand to set the fixed value of exposure compensation, problems frequently occur in that the image may shift from the desired image, or that the timing of photography (release of the switch) is contrary to the intention of the photographer.

With a camera equipped with two command dials, this type of problem occurs too frequently.

The essential problem is that in order to photograph the target image, the photographer must perform a prescribed operation while operating various function selection components and while looking away from the finder.

Examples of the described mode settings include the shutter speed setting, exposure compensation amount setting, diaphragm stop setting, program mode setting, aperture-priority mode setting, shutter-priority program mode setting and manual mode setting.

The selection of one of these various modes is made on the basis of the desires of the photographer through the operation of the mode setting structure described above.

In addition, changing of the set contents of the selected mode is also accomplished through the operation of the command dial according to the desires of the photographer.

For example, when the shutter speed is set as the mode, increasing or decreasing of the shutter speed value is accomplished through the operation of the command dial.

Setting of other values that can be set, for example the diaphragm stop or exposure compensation value, is performed in a similar manner.

In addition, recently a camera has also been proposed in which the designation of an operating mode and the setting of the contents of the designated mode are accomplished, besides manual operation, through the alignment action of the photographer's vision on a preset area. This type of camera has a function wherein the visual line position of the photographer is detected, and when it is determined that the photographer's vision is aligned on a preset area, the designation of an operating mode and the setting of the mode contents are accomplished in accordance with the alignment state of the photographer.

In other words, which area is indicated by the position of the visual line of the photographer is determined through the output of a visual line position detection device. Furthermore, a mode selection area is provided in order to set the various modes such as the program modes and the manual mode, and an area is provided to set the contents of the designated mode.

The photographer designates a mode by aligning his vision on a preset setting area, and in addition, the photographer can set the contents of the designated mode by aligning his vision on an area for setting the contents of the designated mode.

As noted above, with recent cameras, a camera is provided to the photographer that has a plurality of functions and that is high in performance. Furthermore, the manual operation of the mode setting device and the command dial, which comprise the operation members provided on the outside, and the action of visually aligning on a preset area, are accomplished in order to select quickly and appropriately the desired function from among the plurality of selection choices.

Furthermore, in consideration of the cost, the condition of the layout, and properties that the various camera modes possess, the camera is designed and manufactured so that the various modes are determined to be either the object of manual operation, or the object of the visual alignment operation, or the object of both manual operation and the visual alignment operation.

However, among the plurality of camera modes, camera modes are generally provided with sufficient ease of operation even though they are the object of only a manual operation.

This notwithstanding, even with camera modes that have sufficient ease of operation by being set as the object of manual operation, in consideration of the fact that photography is accomplished while looking through the viewfinder so that shutter opportunities are not missed, when the photographer wants to make minute adjustments to the set contents of the operating mode immediately prior to release, it is necessary for the photographer to look away from the viewfinder, and conduct manual operation of the command dial.

Shutter opportunities are missed through the need to conduct this kind of operation.

SUMMARY OF THE INVENTION

The present invention has an object of providing cameras that variously resolve the above-mentioned problems and that have improved operability.

With the present invention, a fixed area is provided within the finder for the visual line position detection. The content of an operating mode that has been correlated in advance to the area can be changed by the photographer aligning his vision on the area.

In other words, the act of the photographer visually aligning on the fixed area accomplishes the same function as the pushing of an operating button on the camera. In this condition, in a first embodiment of the present invention, through operating the mode contents setting device, the content of the operating mode can be changed.

As a result, the photographer can change the set content by operating the mode content setting device while aligning his vision on the set area and operate the camera without looking away from the finder. "Shutter chances" will not be lost, and the operability of the camera is improved.

Therefore, a device is provided whereby adjustment of the set contents can be accomplished without missing shutter opportunities.

In the present invention, a camera is provided in which manual operation is made possible by providing a mode setting device and a mode contents setting device. Additionally, a visual alignment operation for switching operating modes is possible by providing a visual line position detection device and a processing device that changes the operating mode and the content of the operating modes through visual alignment actions. Furthermore, in a second embodiment of the present invention, an operation device commences the operation of a selection device that automatically controls the operation of the camera related to various camera modes and the changing of contents of various camera modes.

The control device is started and specific control is accomplished through the manual operation of the operation device. The control device accomplishes a process wherein the camera mode which has been designated by the mode setting device is discerned, and the discerned camera mode is made to be the operating mode, which is the object of the setting of contents with the aforementioned processing device.

Accordingly, the camera mode, which comprised the object of manual operation becomes, through the manual operation of the operation device, the object of the visual alignment operation, enabling the photographer to conduct the setting of the mode contents without looking away from the viewfinder.

BRIEF DESCRIPTION OF THE DRAWINGS

The invention will be described in detail with reference to the following figures in which like reference numerals refer to like elements, and wherein.

DETAILED DESCRIPTION OF PREFERRED EMBODIMENTS

The first embodiment of the present invention is described hereafter, with reference to FIGS. 1–9.

Figure 1:
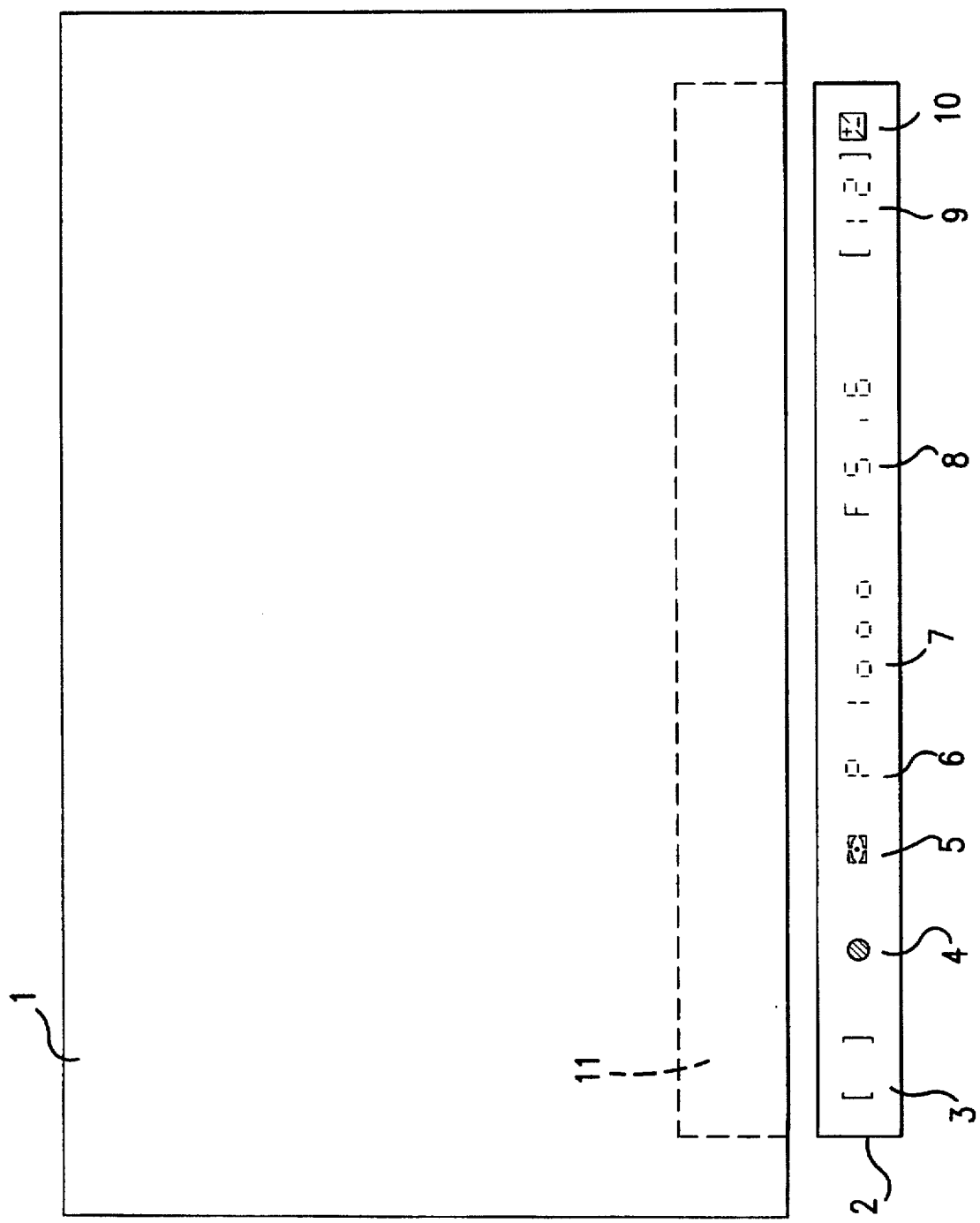
FIG. 1 is a drawing showing the display inside a viewfinder of a first embodiment of the present invention.

FIG. 1 shows the interior of the camera finder of the first embodiment of the present invention.

In FIG. 1, a viewfinder screen 1 is shown adjacent a display 2 inside the viewfinder. The display 2 shows the operating conditions of the camera. This display may, for example, be an LED display device or a liquid crystal display device.

Display 2 includes a focus area display 3 that indicates the operating condition of the auto-focus, a focus area 4 that shows whether the camera is focused, a photo metering mode display 5 that shows whether photo metering is being accomplished by some method matrix metering, spot photo metering, or the like, a light exposure mode display 6 that displays in which mode exposure is being accomplished (for example, program, shutter priority-automatic, aperture priority-automatic, manual) a shutter speed display 7 that indicates the shutter speed, a diaphragm display 8 that indicates the aperture value, a film counter/exposure compensation value display 9 that indicates the amount of film that has been wound up and the exposure compensation value, and an exposure compensation mark 10 that indicates that exposure compensation is being accomplished. A visual line detection area 11 (shown by the dashed frame) for carrying out the camera operations is included in the viewfinder screen.

By viewing the display 2 inside the viewfinder, it is possible for the photographer to promptly determine the operating conditions of the camera. The display 2 inside the viewfinder in FIG. 1 is structured so that a fixed display, which does not exceed one line, will be accomplished by a function in the camera.

Figure 2:
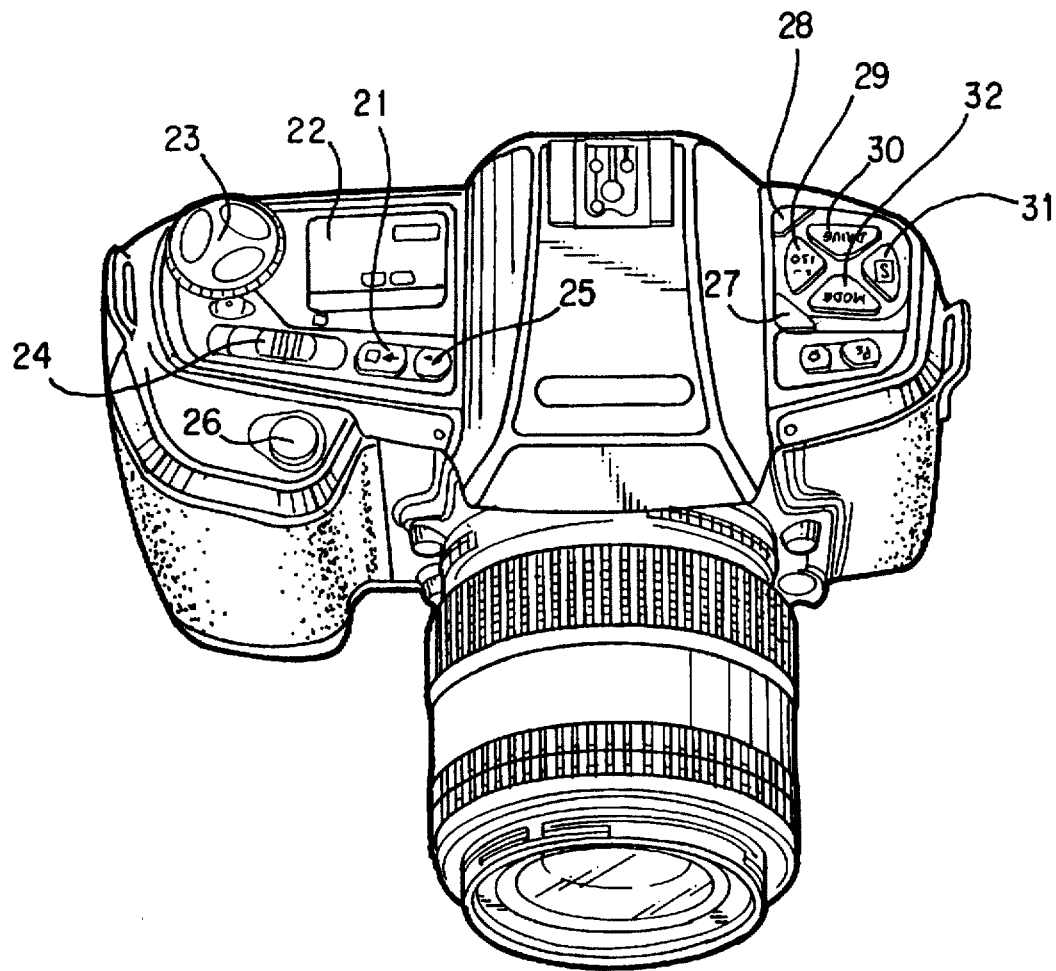
FIG. 2 is a plan view of a camera of the first embodiment of the present invention.

FIG. 2 shows an example of the top view of a camera of the present invention.

FIG. 2 shows how the conventional operating mode setting buttons that activate various functions are positioned on a camera.

The camera of FIG. 2 includes an exposure compensation button 21, an external liquid crystal panel 22 that displays the activation condition of the various functions, a command dial 23 for changing the contents of the set operating mode, a main switch 24 for turning the electrical supply on and off, a rewinding button 25 for rewinding the film, a release button 26 that is depressed when a photograph is to be taken, a photo metering mode button 27 for designating the photo metering mode, a self timer button 28, a film sensitivity button 29 for choosing whether the setting of the film sensitivity will be automatic or manual, a film feeding mode button 30 for indicating film feeding, a syncro mode button 31, and an exposure mode button 32 for indicating the exposure mode.

If the setting contents of the photo metering mode is to be changed, the photographer can change the photo metering mode contents to "matrix metering," "center-weighted metering," or "spot photo metering" (supposing that these three setting contents of the photo metering mode have been determined for the camera in advance) by rotating the command dial 23 while depressing the photo metering mode button 27.

The corresponding operations must be accomplished while the photographer is looking away from the finder.

However, in order to avoid missing a "shutter chance" or to confirm changes in the exposure through changes in the setting contents, it would be advantageous for the photographer to carry out the photography without looking away from the finder.

As shown in FIG. 1, a fixed area is provided within the finder, and when it is determined that the photographer is aligning his vision on this area, the same function is accomplished as if some operating button had been depressed. The function of the command dial is then changed, and the structure can be such that the contents of the operating mode that has been correlated to the fixed area can be changed.

Figure 3:
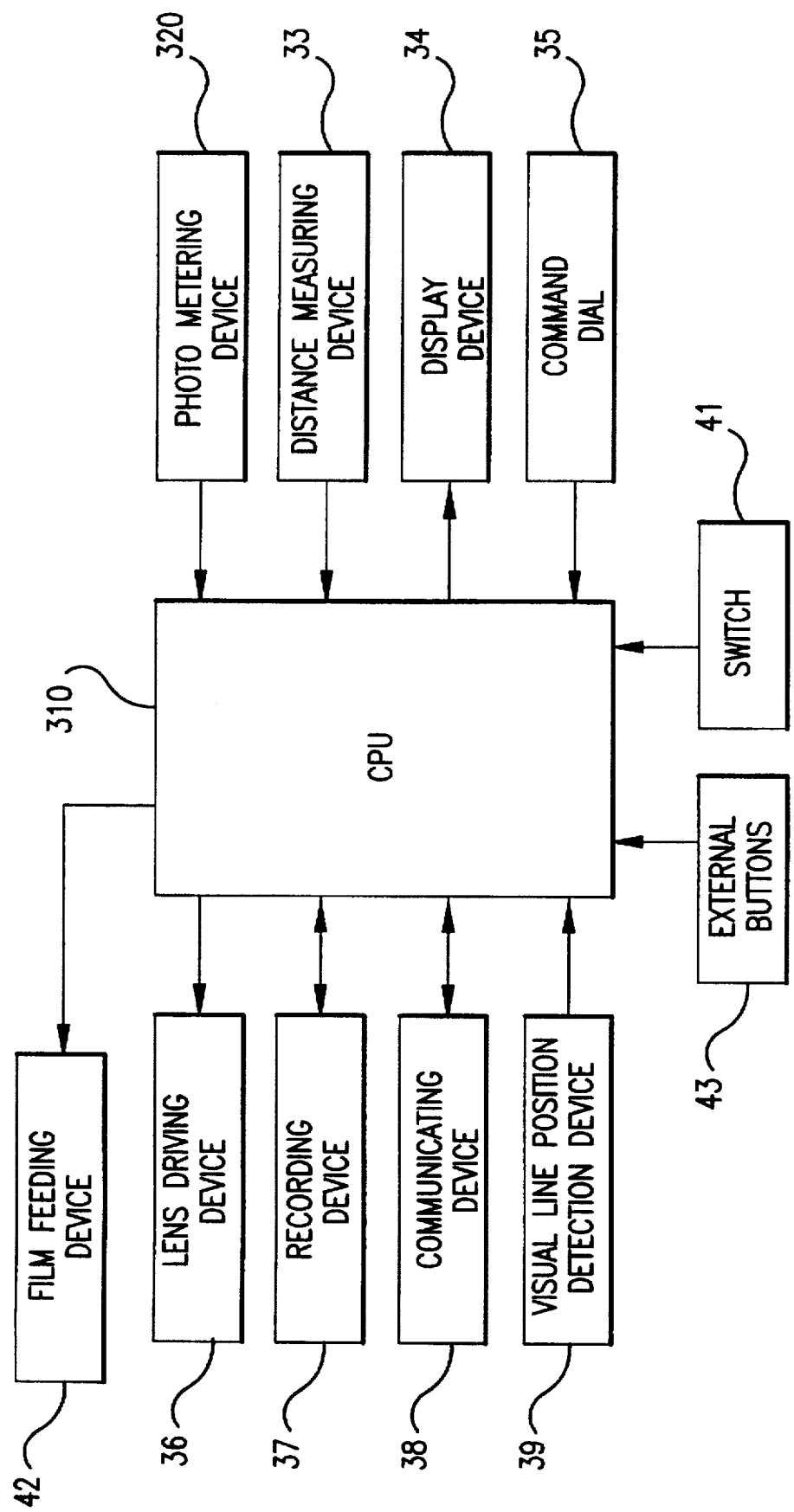
FIG. 3 is a block diagram of the first embodiment of the present invention.

FIG. 3 is a block diagram that shows an example of the structure of the interior of the camera.

A non-volatile recording device 37, for example, an EEPROM, records data, for example, necessary constants and the like.

A CPU 310 controls the operation of the camera as a whole. The CPU 310 carries out various operations, following programs that are built-in in advance. A RAM (not shown) is normally built into the CPU 310. The RAM stores the calculated results from the various calculations accomplished by the CPU 310.

A visual line position detection device 39 detects the position of the visual line of the photographer. The visual line position detection device 39 may comprise an optical system such as that stated in Japanese Laid-Open Patent Application No. 1-241511 or the like, but since this is commonly known technology, a detailed description is omitted. The visual line position detection device may also comprise a visual line position detection device that adjusts for dynamic compensations of the camera, such as, for example, diopter adjustment as disclosed in commonly assigned U.S. application Ser. No. 08/414,993 to Kazuharu Imafuji et al., filed Mar. 31, 1997, (Attorney Docket No. JAO 32120), now U.S. Pat. No. 5,619,294.

With the present embodiment, this visual line position detection device 39 comprises a beam splitter, a light collecting lens, and a CCD element.

The photographer's eye is illuminated by an infrared light emitting element. The infrared wave reflected from the eye is reflected by the beam splitter, the reflected light is gathered into the light gathering lens, and an image of the eyeball is formed onto the CCD element. Based on the formed image position information of the eyeball image on the CCD, the position of the visual line of the photographer can be calculated by a calculating device.

Thus, the information concerning the visual line position of the photographer, or in other words, the conformed image position information of the eyeball image on the CCD, is transmitted to the CPU 310. Through a calculating procedure that is based on the transmitted information, the CPU determines whether the photographer is aligning his vision on the fixed area inside the finder.

A photo metering device 320 measures the brightness of the subject in order to determine the exposure. The photo metering device may, for example, comprise multiple photo diodes and a current/voltage transforming circuit for each photo diode. The photo metering result is transformed to a digital signal via an A/D converter and transmitted to the CPU 310.

A distance measuring device 33 measures the distance to the subject. Various methods are available as the method of measuring the distance to the subject, and it will be apparent that any of these methods may be used.

As an example, a method may be used in which the distance to the subject is measured by forming subject images on the CCD via a two path optical system that is affixed inside the camera body and by calculating the position difference of both images on the CCD. This is the so-called passive method.

For example, a device with a so-called many-point distance measuring function, which carries out distance measurement for multiple areas in the photographic field, may be used.

A display device 34 displays information that shows the various conditions of the camera, such as shutter speed, aperture value, and the like. For example, an LED element that displays various symbols, a liquid crystal display device, or the like may be used for this device.

The structure may be such that the display device 34 is provided inside the viewfinder so that the photographer can see the display contents within the viewfinder.

A mode contents setting device includes a command dial 35 that changes the contents of the currently set mode according to the direction of rotation of the dial. For example, the numerical value of the shutter speed, diaphragm, and the like can be increased (up) or decreased (down).

In addition, when the contents to be changed are not numerical values but a heading or the like, the heading content is changed by the operation of the command dial. For example, in the case of the photo metering mode, the heading contents that are to be set are changed to "matrix metering," "center-weighted metering," or "spot photo metering," according to the operation of the command dial.

Switch 41 is a half-press switch that is used at the time of photography and that can also perform the release operation.

External buttons 43 can comprise various types of buttons provided on the camera exterior shown in FIG. 2. The buttons are provided for each function (operating mode) of the camera.

The CPU 310 correlates the camera mode that has been selected in advance to the above-mentioned set area, and this correlating information may be stored in the recording device 37.

A lens driving device 36 drives the lens. The photo lens is driven so that an image of the subject is formed in a fixed position, or in other words, so that the subject is focused on the film surface, based on the data detected by the distance measuring device 33.

The lens driving device 36 comprises a moving mechanism that can move the lens system a set distance. For example, the lens driving device comprises a lens, a moving component that is affixed to the lens and that can slide, and an actuator that causes the moving component to move a set distance. The movement distance that the moving component moves is calculated by the CPU 310 by a program that has been set in advance, based on data detected by the distance measuring device 33. The CPU 310 may be structured so as to give a moving signal based on the calculated result to the above-mentioned actuator.

A film feeding device 42 advances or rewinds the film as necessary.

A communicating device 38 carries out data communication with an external mechanism such as an accessory or the like. Through this communicating device, it is possible to transmit information between the external mechanism and CPU 310.

Based on the measured result of the photo metering device 320, structural elements that are necessary for photography such as an exposure device that controls the shutter speed and the like are provided so that the correct exposure will be accomplished on the film surface.

The operation of the present structure is described below.

First, it is necessary to carry out a set operation in order to assign a function (one of the operating modes) to the area 11 shown in FIG. 1.

As one method, the structure may be such that when an above-mentioned external button that corresponds to a camera function is pressed, the CPU 310 determines that the function (operating mode) corresponding to the button that has been pressed has been assigned in advance to the area 11.

As an alternate method, it is conceivable that a separate "function selection button" is provided on the camera, and the CPU 310 carries out a process of determining the operating mode to be assigned in advance to the area 11 through the rotary operation of the command dial while pressing this button.

Figure 4:
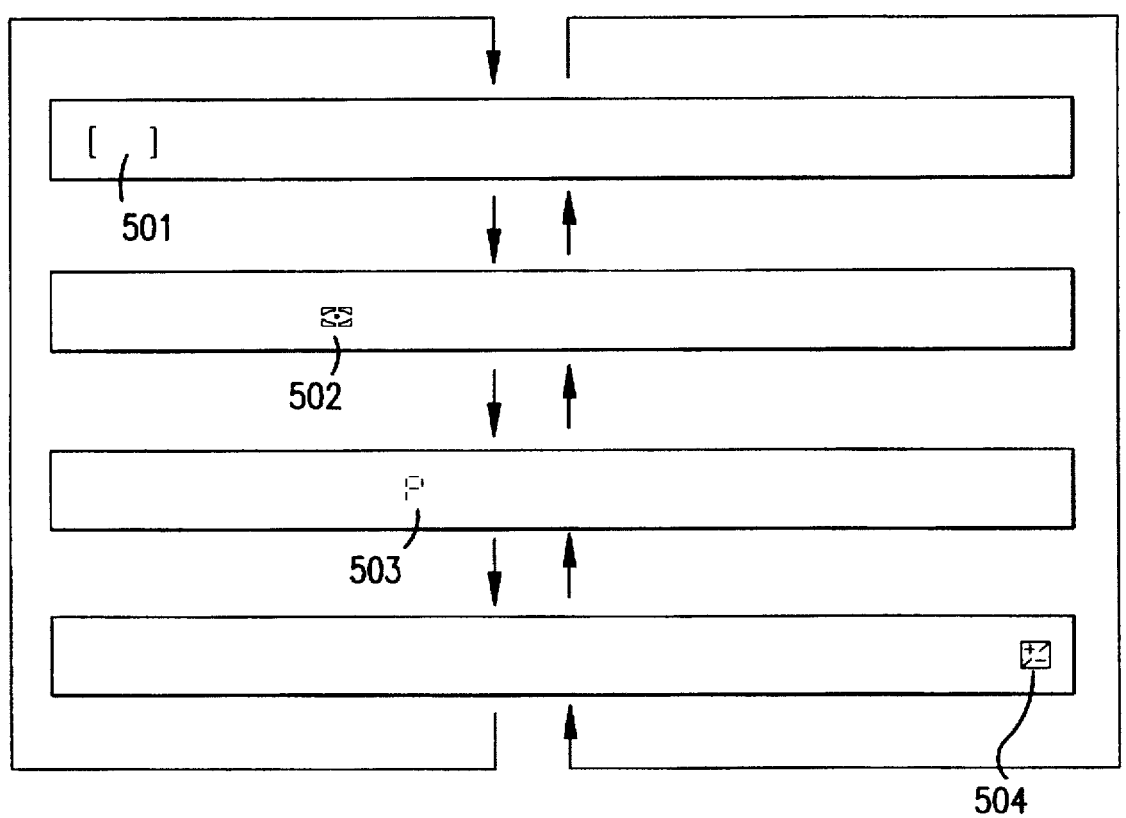
FIG. 4 is a drawing of an example of display of the first embodiment of the present invention in an operating condition.

Through the rotary operation of this command dial, the inside of the finder display 2 changes, for example, between four camera modes, as shown in FIG. 4: "focus area," "photo metering mode," "exposure mode," and "exposure compensation."

As an alternate method of determining the camera mode, a method may be employed by which the inside of the finder display 2 is changed, as shown in FIG. 4, through the rotary operation of the command dial while multiple external buttons 43 are pressed simultaneously. In this case, it is not necessary to provide a special "function selection button." FIG. 4 shows from top to bottom a focus area at 501, a photo metering mode display at 502, an exposure mode display at 503, and an exposure compensation mode display at 504.

Still another method may be used, in which the camera and a personal computer, which is an external mechanism, are connected via a communicating means 38, and the operating mode corresponding to the area is set.

In each case, the information of the camera mode that corresponds to area 11 of FIG. 1 may be recorded in the non-volatile recording device 37 shown in FIG. 3.

In the manner described above, one of the multiple camera modes is assigned to area 11 shown in FIG. 1.

Next, it is determined by the visual line position detection device 39 and the CPU 310 whether the photographer is aligning his vision on the area 11. If it is determined that the photographer is not aligning his vision on area 11, a special procedure is accomplished, and an operation is accomplished inside the camera for taking the picture by the photographer.

When the CPU 310, acting as a processing device, determines that the photographer is aligning his vision on area 11, the operation of the command dial is changed so that the content of the camera mode that has been correlated in advance to the above-mentioned set area can be changed through the rotary operation of the command dial. The variable headings and variable numerical values stored in advance in the EEPROM are taken into the register so that the CPU 310 can refer to the content of the recording means, read the content of the camera mode that has been determined in advance, and change the content of the appropriate camera mode.

By detecting the rotary operation of the command dial 35, the camera mode content is changed according to the rotary operation. Furthermore, the CPU 310 displays the changed information on the display device 34.

Through this type of structure, the setting content of the desired camera mode can be changed by the action of the photographer aligning his vision and the manual operation of the command dial. The photographer can take a picture without looking away from the finder.

Thus, "shutter chances" or the like will not be lost.

In the embodiment described above, there is one area 11, but it is conceivable that an area could be provided for each camera mode. In this case, it would be necessary to set the camera mode corresponding to each area in advance, but the setting of the camera modes corresponding to the areas could be accomplished through the same procedure as with the case of just one area. In addition, the alteration of the setting content of the camera mode corresponding to the one area among the multiple areas upon which the photographer is aligning his vision may be accomplished through the operation of a command dial.

Specifically, for example, a layout of various areas is conceivable in which an area corresponding to the "exposure compensation mode" is provided on the bottom right half of screen 1 in FIG. 1, and an area corresponding to either the "photo metering mode," "exposure mode," or "focus area" is provided on the bottom left half of the screen.

Cameras generally repeat a series of procedures: photo metering procedure, exposure calculation procedure, distance measuring procedure, AF (auto-focus) calculating procedure, and display procedure. When a specific operation, for example, the operation of pressing the release button or operating the command dial, is performed, a fixed assigning procedure is accomplished.

Figure 5:
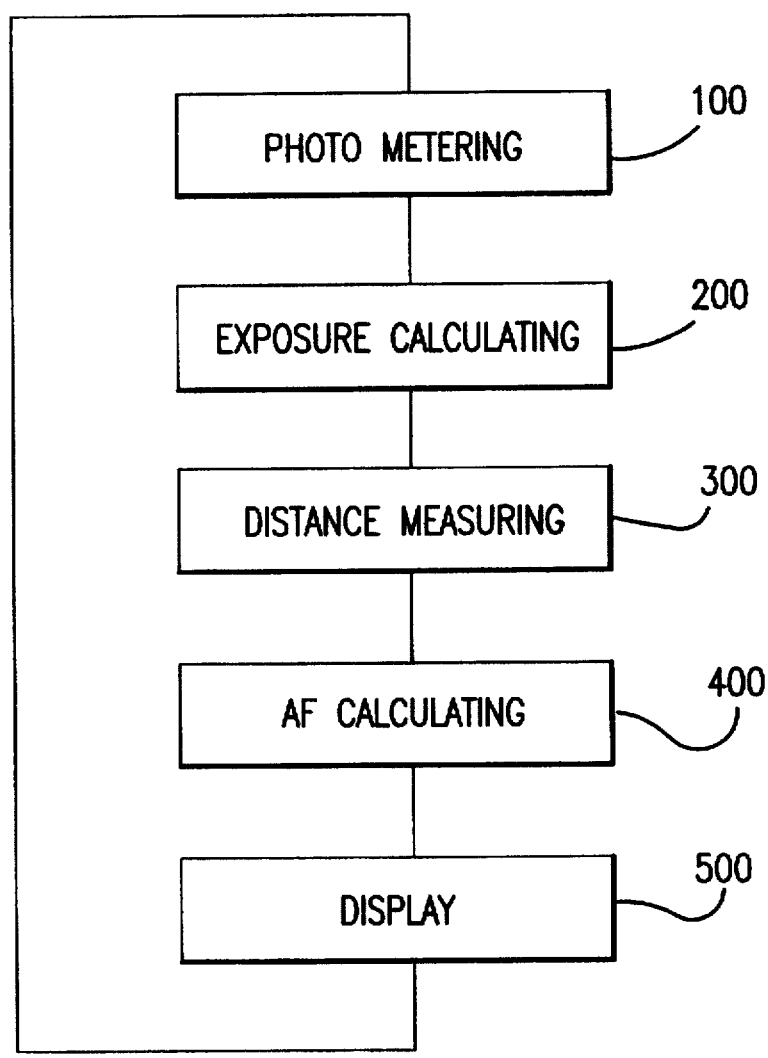
FIG. 5 is a procedural flow chart relating to the first embodiment of the present invention.

FIG. 5 is a flow chart that shows those repeated operations that are accomplished in the camera. Normally, the following series of procedures is accomplished: a photo metering procedure (step 100), an exposure calculating procedure (step 200), a distance measuring procedure (step 300), an AF calculating procedure (step 400), and a display procedure (step 500).

When a specific operation is accomplished, the CPU temporarily branches away from the processing routine shown in FIG. 5, carries out a set procedure that has been determined in advance, and returns to the processing routine shown in FIG. 5 after completing the procedure.

A specific operation is an operation such as the release operation or an operating mode content setting operation. More specifically, for example, these specific operations are photo metering mode content changes, setting of shutter speed values, and the like.

When the camera mode is "manual" or "shutter priority auto," the shutter speed is changed when the command dial is rotated. When the camera mode is "program mode," the shutter speed and aperture value are both changed.

Also, when the exposure compensation mode is correlated to the set area, the program deviates from the normal processing routine shown in FIG. 5 through the action of the photographer aligning his vision on the set area. The content of the exposure compensation amount can then be set by rotating the command dial.

In addition to the operation accomplished by the visual line position detection, the structure may be such that the operating mode can be set and the contents of the set operating mode changed by pressing function buttons, which are operating components and which are normally provided on the camera body. In this case, through the pressing of function buttons, the CPU branches off from the normal processing routine shown in FIG. 5 to a routine that carries out a set procedure, and the set procedure is accomplished.

Figure 6:
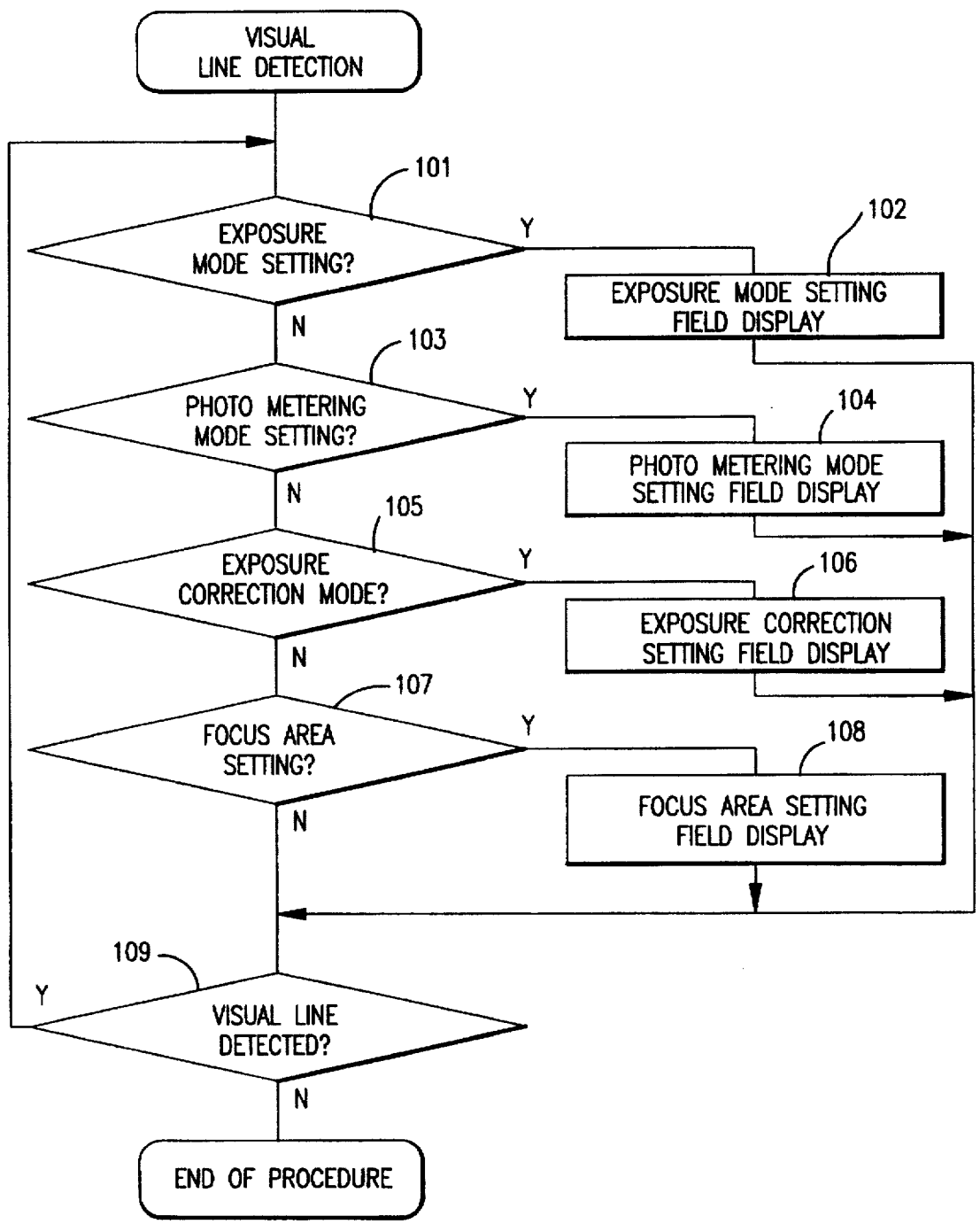
FIG. 6 is a procedural flow chart relating to the first embodiment of the present invention.

A flow chart showing an example of this type of set routine that is executed through the carrying out of a specific operation is shown in FIG. 6.

In FIG. 6, when the photographer has aligned his vision on the set area, it is determined which camera mode has been defined for the set area by using a device that has a recording means, and the necessary procedure is accomplished.

At this point, "exposure mode," "photo metering mode," "exposure compensation mode," and "focus area" exist as camera modes that can be defined in the set area by the photographer in advance. The method of defining the camera mode for the set area is as described above.

The CPU 310 refers to the content of a flag setting component provided in the recording device corresponding to each mode and determines which mode has been defined.

In other words, for example, there is a flag setting component with 4 bits. The "exposure mode" is assigned to the bottom-most bit. The "photo metering mode" is assigned to the second bit from the bottom, the "exposure compensation mode" is assigned to the next bit, and the "photo area" is assigned to the top-most bit.

If the information of a bit is a "1," the operating mode corresponding to that bit is correlated to the set area. For example, if the information for all of the bits is "0001," the "exposure mode" is correlated to the set area. If the bit information is "0010," the "photo metering mode" is correlated to the set area.

Conversely, the structure is made to be such that a flag is set to correspond to the operation in which the photographer defines the operating mode for the set area.

First, in step 101, the CPU 310 refers to the content of the flag setting component and determines whether or not the exposure mode has been defined for the set area, which is for the visual line position detection.

If the exposure mode has been defined (Y in step 101), in step 102, the CPU 310 controls the display device 34 in a manner that indicates that the operating mode of the camera has changed to the exposure mode setting. For example, an exposure mode indicator mark is displayed on the display device that shows the operating condition.

If the exposure mode has not been defined for the above-mentioned area (N in step 101), the CPU advances to step 103, and the CPU 310 refers to the content of the flag setting component and determines whether or not the photo metering mode has been defined. If the photo metering mode has been defined (Y in step 103), the CPU advances to step 104 and displays a symbol showing that the photo metering mode has been set.

Similarly, if the exposure mode has not been defined for the set area (N in step 103), in step 105, the CPU 310 refers to the contents of the flag setting device and determines whether or not the exposure compensation mode has been defined. If the exposure compensation mode has been defined (Y in step 105), the CPU advances to step 106 and displays a symbol showing that the exposure compensation mode has been set.

If the exposure compensation mode has not been defined for the set area (N in step 105), in step 107, the CPU 310 refers to the contents of the flag setting device and determines whether or not the focus area has been defined. If the focus area has been defined (Y in step 107), in step 108, a symbol is displayed showing that the focus area has been set.

When steps 102, 104, 106, and 108 have been completed, and if the focus area has not been defined for the set area in step 107, the CPU advances to step 109.

In step 109, it is determined whether or not the photographer is aligning his vision on the set area. If the photographer is aligning his vision on the set area, the CPU returns to step 101 and repeats the actions stated above. If the photographer is not aligning his vision on the set area in step 109, the procedure shown in FIG. 6 ends, and the CPU returns to the normal processing routing shown in FIG. 5.

The normal display condition 511 (top of FIG. 8) and the display condition 512 corresponding to steps 102, 104, 106 and 108 (bottom of FIG. 8) are such that they can be clearly distinguished. The example shown at the bottom of FIG. 4 is a display example of the case in which the exposure compensation mode is indicated.

If the camera mode defined for the set area is recorded and maintained in the non-volatile recording means, when it is determined that the photographer is aligning his vision on the set area, based on the information output from the visual line position detecting device 39, the CPU 310 acting as a processing device can directly call the camera mode that is recorded in the recording device and set the contents of the mode according to the operation of the command dial.

Figure 7:
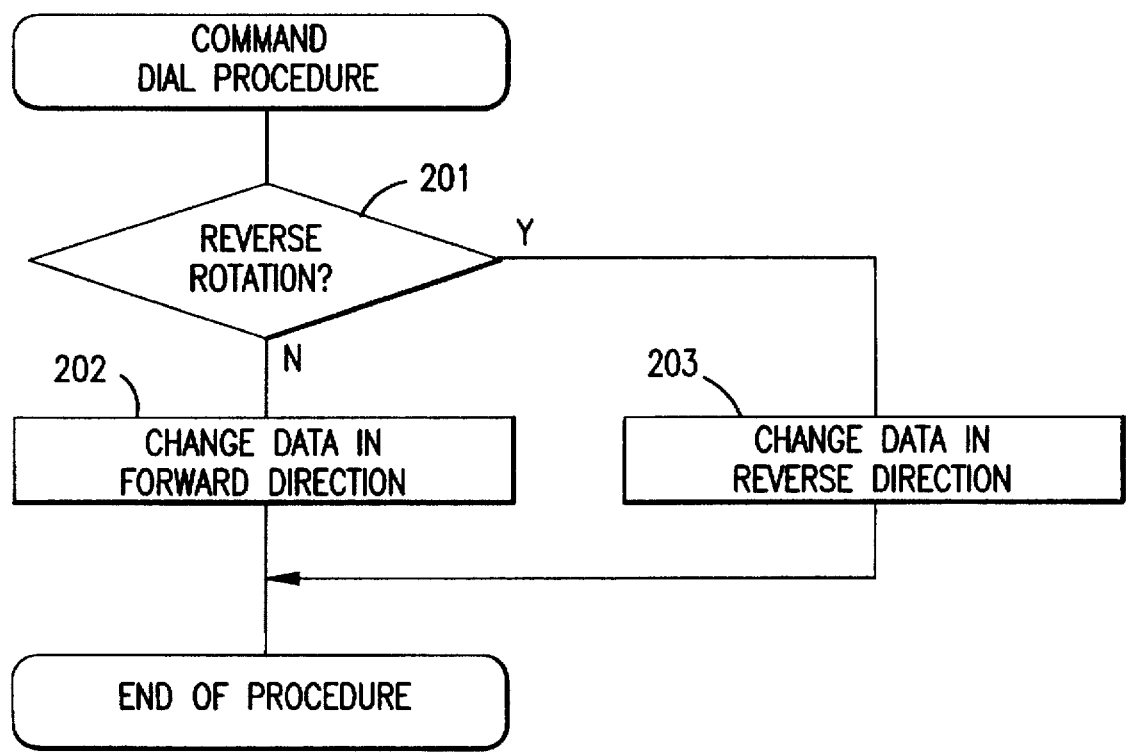
FIG. 7 is a procedural flow chart relating to the first embodiment of the present invention.
Figure 8:
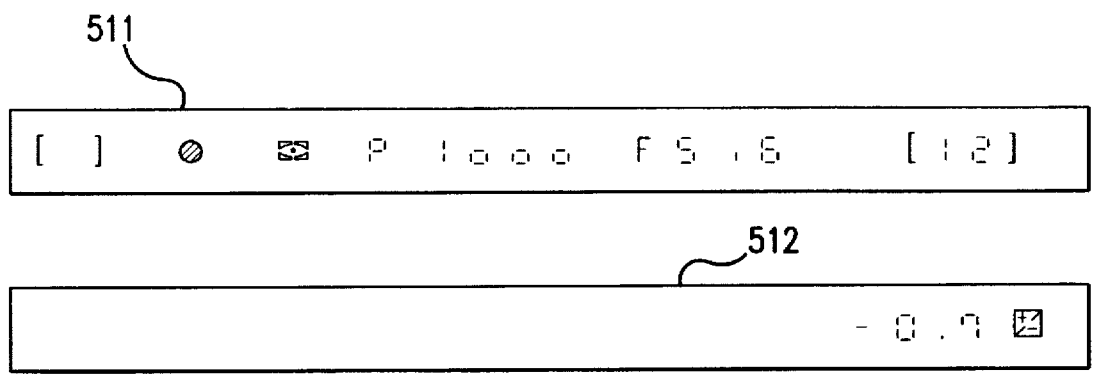
FIG. 8 is a drawing of an example of a display of the first embodiment of the present invention in an operating condition.

In FIG. 6, when the set camera mode has been determined as the operating mode and the command dial is operated, the CPU 310 carries out an interrupting procedure. Namely, the procedure shown in FIG. 7 is executed.

This procedure is a procedure pertaining to the operation of the command dial.

The command dial can be rotated both forward and in reverse. For example, if the contents to be changed is a numerical value, a forward rotation of the dial will increase the numerical value, and a reverse rotation will decrease the numerical value. Obviously, the setting contents may also comprise multiple terms and need not be numerical.

First, in step 201, the CPU 310 determines the direction of rotation of the command dial. If the rotation is forward, the CPU proceeds to step 202; if the rotation is in reverse, the CPU proceeds to step 203. For example, a forward rotation is assumed to be the clockwise direction, and a reverse rotation is assumed to be in the counter-clockwise direction.

In step 202, since the rotation is in the forward direction, the CPU 310 increases the set numerical value, according to the rotation. Conversely, in step 203, since the rotation is in the reverse direction, the CPU 310 decreases the set numerical value, according to the rotation. The procedure then ends, and the CPU returns.

Figure 9:
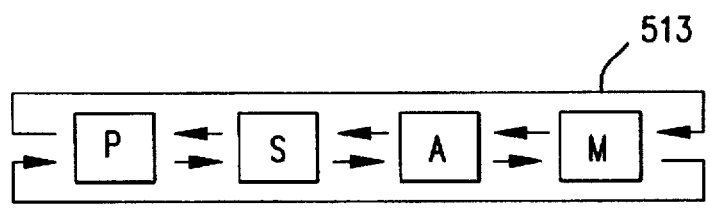
FIG. 9 is a drawing of a setting contents change accomplished through the operation of a command dial of the first embodiment of the present invention.

FIG. 9 shows a content setting example 513 in the exposure mode. This is not a numerical alteration, but a heading alteration.

In this figure, "P" indicates program auto, "S" indicates shutter priority auto, "A" indicates diaphragm priority auto, and "M" indicates manual.

According to the direction of rotation of the command dial, the exposure mode is changed in the order of "P," "S," "A," "M," and "P" (forward direction), or else in the reverse order (reverse direction).

When the procedure of FIG. 7 ends, or in other words, when the operation of the command dial is finished, the CPU once again returns to the processing routine shown in FIG. 6.

As described above, in the present invention, since the same function is accomplished through the photographer aligning his vision on a set area as if function buttons had been pressed for the camera functions for which content settings are to be accomplished through the command dial, the desired setting content changes can be made for a given function without looking away from the finder.

In order to accomplish the above, it is desirable for a set area to be in the vicinity of the display means that displays the operating conditions of the camera. "Photo metering mode," "exposure mode," "exposure compensation mode," and "focus area" were described as examples of the operating modes for which the setting content may be changed. These modes are camera modes for which it is desirable to have a display in the finder to show the setting contents. For example, the setting of ISO sensitivity or the like is not displayed in the finder, and other modes that are not hindered even if the photographer looks away from the finder to set the modes have been excluded. However, the structure may be such that these modes, too, are correlated to the set area, and the contents setting operation is performed by the vision alignment action of the photographer.

According to the first embodiment of the present invention as described above, since the contents of the camera modes can be set by the photographer aligning his vision on a set area and operating a command dial without the photographer looking away from the finder, the photographer will not miss a "shutter chance." In addition, if the set area is provided in the vicinity of the display means inside the finder, the operability of the setting operating will be improved.

A second embodiment of the present invention is described hereafter, with reference to FIGS. 10–13.

Figure 10:
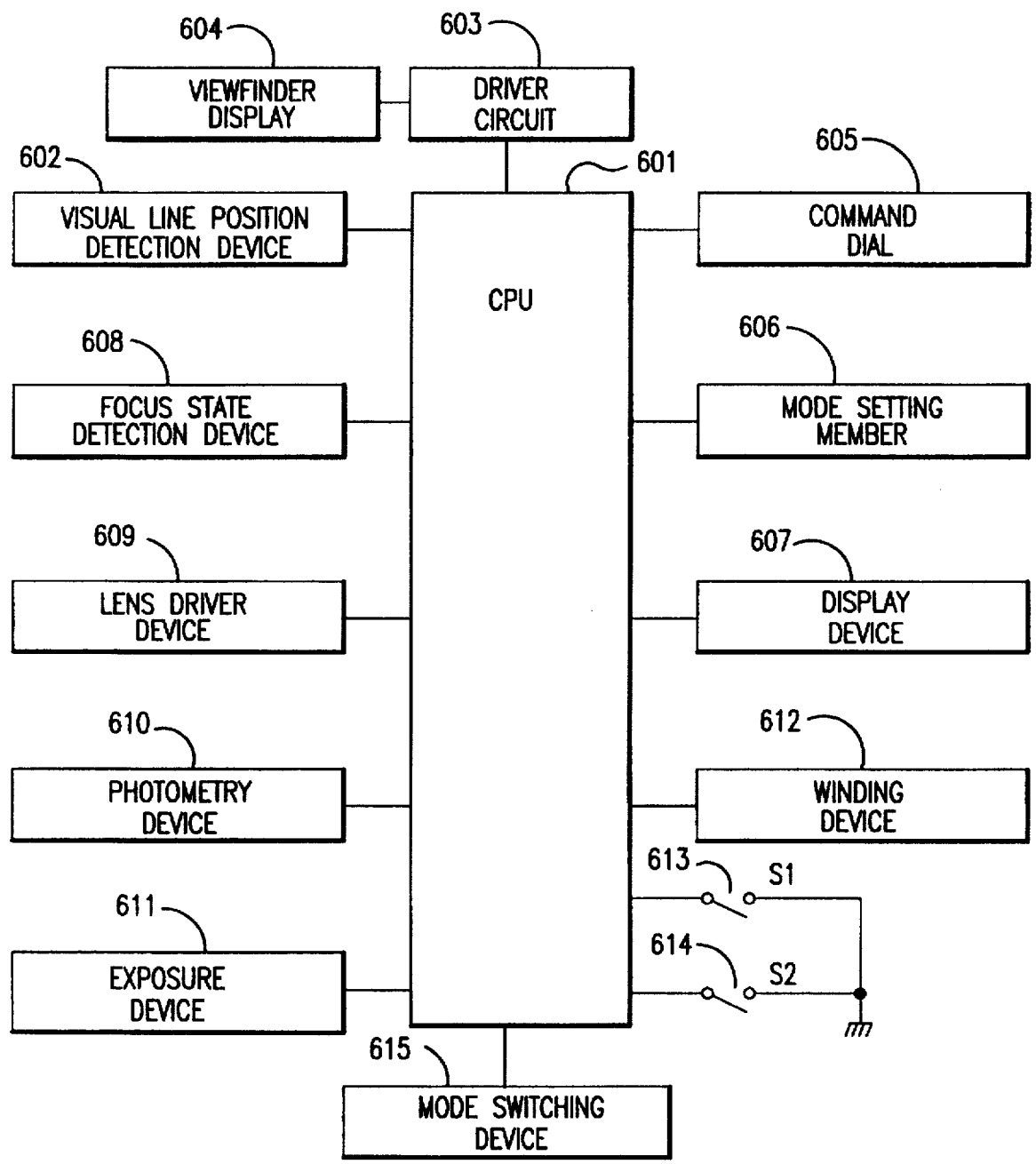
FIG. 10 is a drawing showing an example of the configuration of a camera according to a second embodiment of the present invention.

FIG. 10 is a block diagram showing an example of the configuration of this embodiment of the present invention. A CPU 601 controls the actions of the camera as a whole. A ROM and RAM are connected to the CPU 601, although such are unrepresented in the drawing, and the CPU 601 accomplishes the various actions following a program stored in the ROM. In addition, the results of various calculations performed by the CPU 601 are stored in the RAM. Details of the contents of the memory of the RAM are described hereinafter with reference to FIG. 13.

The CPU and the associated memory devices operate as a control device to control camera operations and the various camera modes and their contents and their relationship to various camera components.

A visual line position detection device 602 detects the position of the visual line of the photographer by detecting the position in the viewfinder on which the photographer is aligning his vision. For example, the visual line position detection device can be realized through the optical system in previously noted Japanese Laid-Open Patent Application No. 1-241511.

The visual line position detection device 602 may include, for example, an infrared light generating element, a beam splitter, a condenser lens and a CCD element.

Information about the position of the visual line of the photographer, in other words, information about the position of the image of the eyeball on the CCD, is sent to the CPU 601, which determines on what area within the viewfinder the photographer is aligning his vision using a computation process based on the information that has been sent.

A specific example of the areas noted above will be given hereinafter, but other arrangements may be used that provide in the viewfinder a mode setting area for designating a camera mode and a numerical value setting area in order to change the contents of the designated mode. In other words, the designation of the camera mode as the operating mode is accomplished through the action of the photographer aligning his vision on the mode setting area, wherein increasing or decreasing of the setting value is accomplished by the photographer aligning his vision on the numerical value setting area. Naturally, it would also be appropriate for an area enabling the selection of a desired item to be used instead of the numerical value.

A viewfinder display component 604 displays in the viewfinder the various operating states of the camera, such as the current camera mode, the shutter speed, the diaphragm stop and the like. In the second embodiment, this component is comprised of an LED that displays various symbols, a liquid crystal display device and an EL display device.

A driver circuit 603 drives the LED, liquid crystal display and EL display, which comprise the viewfinder display component 604 according to commands sent from the CPU 601, and in the present embodiment, this circuit is comprised of electronic devices such as transistors, resistors, and various CMOS components.

A mode contents setting device includes a command dial 605 provided on the outside of the viewfinder, and the value of the currently set mode, for example the numerical value of the shutter speed, diaphragm stop or exposure compensation value is either increased (up) or decreased (down) depending on the direction of rotation of the dial.

Command dials 605 can also be separately provided for increasing and decreasing these values.

The command dial 605 can also change not only the numerical values but the set items as well. For example, when the exposure mode is set as the operating mode, one out of "P", program auto, "A", aperture priority auto and "S", shutter priority auto, and "M", manual, can also be selected by rotating the command dial 605.

A mode setting member 606 and portions of CPU 601 comprise a mode setting device. The mode setting member 606 is located on the outside of the viewfinder, and the operating mode can be set with this mode setting member 606. For example, the mode setting member 606 can be realized through an operation member such as a button, dial-type switch or the like.

Examples of settings of the mode setting member are the shutter speed setting mode, the diaphragm stop setting mode, the exposure compensation mode, the film sensitivity setting mode and various program setting modes.

A display device 607 is provided on the outside of the viewfinder. The display device 607 has the function of displaying the various action states of the camera, and this can be realized, for example, with a liquid crystal display device or the like.

The contents of the display on the display device 607 can include, for example, the designated operating mode, the contents set with the command dial, or the diaphragm stop or shutter speed at the time when a switch is depressed halfway or at the release time, but this information is intended to be illustrative and not limiting.

A focus state detection device 608 accomplishes detection of the distance to the subject. The action of focus state detection is accomplished through pressure being applied to the release switch 614.

Various types of methods have been proposed as methods for measuring the distance to the subject, and it would be appropriate to use any of these methods. As one example, it would be appropriate to conduct focus state detection by using the so-called passive triangulation method discussed above.

It would also be appropriate to use a device that has a so-called multiple focus state detection function that measures the distance with respect to a plurality of areas in the photo field.

A lens driving device 609 drives the shooting lens on the basis of data detected by the focus state detection device 608 so that the image of the subject is formed at a predetermined position, in other words, so that the focussing of the subject coincides with the film plane. The lens driving device 609 can be realized through a movement mechanism that makes movement of the lens system possible over a preset distance.

The lens driving device 609 is comprised of a lens, a movement component that is fixed to the lens and that is capable of sliding, and an actuator that moves the movement component a preset distance. The distance over which the movement component moves is computed by the CPU 601 according to a preset program on the basis of data detected by the focus state detection device 608. Furthermore, it is preferable for the CPU 601 to be configured so as to send a movement signal to the actuator in accordance with the results of these computations.

A photometry device 610 measures illumination information, which is information about the brightness of the subject. For example, this device can be comprised of a plurality of photo diodes and current-voltage conversion circuits for each photo diode. The results of photometry are converted into a digital signal by an A/D converter, and are sent to the CPU 601.

An exposure device 601 controls, on the basis of the photometric results from the photometry device 610, the shutter speed and the like so that a suitable exposure is accomplished on the film surface. For example, this device can be realized with electronic devices such as various CMOS components and transistors. The computation of the shutter speed is performed by the CPU 601 in accordance with pre-loaded programs.

A film winding device 612 winds or rewinds the film as necessary.

A so-called half-depressed switch 613 is used during photography in addition to a release switch 614.

An operation device comprises a mode switching member, details of which will be described below, that accomplishes a preset process. The mode switching member may take various forms, such as a switch, a button or the like.

The mounting position of the mode switching member 615 so determined such that operation by the photographer is easy even while looking into the viewfinder, and it is preferable for this component to be mounted, for example, on the top surface of the body. In addition, it is also desirable for this component to be one in which the operation can be accomplished simply by a single manual operation, such as by pressing the member.

Now, the processes indicated below are examples of preset processes executed through the operation of the operation device, mode switching member 615. These preset processes are accomplished by the CPU 601, according to pre-loaded programs, using the RAM. The CPU 601 operates as a processing device for implementing visual alignment instructions concerning operating modes and operating mode contents and as a control device that further controls the operation of the camera. Here, only an outline of such is provided because a detailed explanation is given hereinafter with reference to FIG. 13.

As a first process, a process is described wherein the camera mode set through manual operation and using the above-described mode setting member 606 is set as the camera mode that is the object of contents changing through the action of vision alignment on the above-described numerical value setting area. In other words, this is a process wherein the camera mode that is the object of manual operation is set as the camera mode that is the object of the visual alignment action.

More specifically, this is a process such that when the shutter speed mode is set through the mode setting member 606, while on the other hand the exposure compensation amount setting mode is set through the visual line position detection device 602, the camera mode, which is the object of the visual alignment action by the visual line position detection device 602, is changed from the exposure compensation mode to the shutter speed mode through operation of the mode switching member 615.

It would also be appropriate for this to be a process wherein not only the camera mode but also the set contents of the camera mode themselves (the values set through manual operation of the command dial) were continuously made the object of the visual alignment operation at the time of operation of the mode switching member 615. In other words, at the time of operation of the mode switching member 615, the photographer would set the value for the camera mode set through the visual alignment operation to a desired value as the initial value of the operating mode setting.

By this means, it is possible for the photographer to make adjustments to the shutter speed through the visual alignment action without looking away from the viewfinder immediately prior to a release, and by this means, the benefit of not missing shutter opportunities is obtained.

Next, as a second process, a process can be considered wherein the camera mode set through manual operation using the above-described mode setting member 606 and the camera mode that is the object of contents changing through the action of vision alignment on the above-described numerical values setting area can be switched.

More specifically, this is a process such that when the shutter speed mode is set through the mode setting member 606, while on the other hand the exposure compensation mode is set through the visual line position detection device 602, the camera mode that is the object of the visual alignment action by the visual line position detection device is changed from the exposure compensation mode to the shutter speed mode through operation of the mode switching member 615, and furthermore, the camera mode in which changing of contents is possible with the command dial 605 is changed from the exposure compensation mode to the shutter speed mode.

Naturally, it would also be appropriate for the process to conduct switching of the set contents themselves and not just switching of the camera exposure.

By this means, it is possible to make the camera mode that was the object of the visual alignment operation the object of manual operation, and to again support the camera mode that has a high probability of being the object of the visual alignment operation, and when necessary, it is also possible to make the camera mode subject to manual operation of the object of the visual alignment operation at any time through operation of the designated switching means again.

Figure 11:
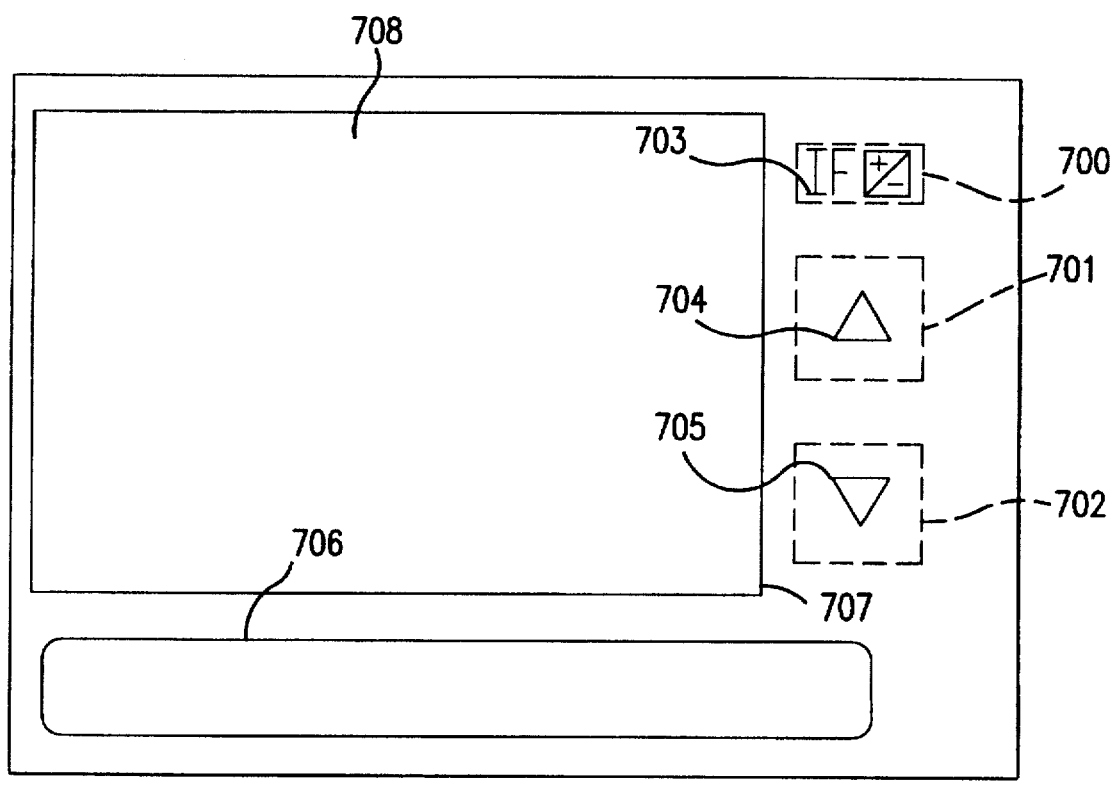
FIG. 11 is a drawing showing the display configuration inside the viewfinder of the second embodiment of the present invention.

FIG. 11 is a diagram showing the display configuration inside the viewfinder.

A viewfinder screen 708 has a viewfinder frame 707. A photography information display component 706 displays information showing the operating state of the camera, the information being sent from the CPU 601, and is realized through the viewfinder display component 604.

Besides this component, displays 703, 704 and 705 shown in FIG. 11 are also accomplished through the viewfinder display component 604.

Area 700, area 701 and area 702 are areas that are used to conduct preset actions through the photographer's alignment of his line of sight with those areas. The CPU 601 determines whether the photographer is aligning his sight on one of the areas on the basis of information output from the visual line position detection device 602.

Area 700 has a function similar to that of the mode setting member 606, which sets the operating mode.

In other words, each time the photographer aligns his line of sight on area 700 for a preset length of time, the operating mode switches, and a display corresponding to the operating mode is accomplished as a mode display 703 within the area.

As one example with the present embodiment, one out of the shutter speed mode, the exposure compensation mode and the diaphragm mode can be designated, and the symbols {T}, {F} and {±} are displayed as the mode display in correspondence to the designation of these modes.

The above is an explanation of normal actions, but when the mode switching member 615 is once operated, a display showing the camera mode that has been designated through manual operation of the mode setting member 606 to become to the operating mode is output on the display in area 700.

Area 701 and area 702 have functions similar to that of the command dial 605. In other words, each time the photographer aligns his vision on area 701 for a preset length of time, the numerical value that is the contents of the operating mode increases, and in addition, each time the photographer aligns his vision on area 702 for a preset length of time, the numerical value that is the contents of the operating mode decreases.

The symbol {▲} shown at reference number 704 is an up display that is used to improve ease of operation by indicating that area 701 is the area that causes the numerical value that is the contents of the operating mode to increase, and in addition, the symbol {▼} shown at reference number 705 is a down display that is used to improve ease of operation by indicating that area 702 is the area that causes the numerical value that is the contents of the operating mode to decrease.

When the mode switching member 615 is operated, the contents of the manual mode designated through manual operation of the mode setting member 606 can be changed through the action of vision alignment on area 701 and area 702.

In FIG. 11, area 701 and 702 are provided to conduct changing of the numerical value contents, but it would also be appropriate to have a configuration wherein areas are provided to conduct changing of set items that are not numerical values. For example, when the exposure mode is set as the operating mode, it would be appropriate to have a configuration in which one out of {P (program shutter)}, {S (shutter-priority automatic)}, {A (aperture priority automatic)}, and {M (manual)} is selectable through the action of vision alignment on a preset area.

In addition, in FIG. 11 the configuration is such that reference numbers 700 to 705 are positioned outside the viewfinder frame 707, but naturally it would also be appropriate for these to be positioned within the viewfinder frame 707.

The specific processes of the present embodiment that are accomplished using the areas and displays shown in FIG. 11 are described in detail hereinafter.

Figure 12:
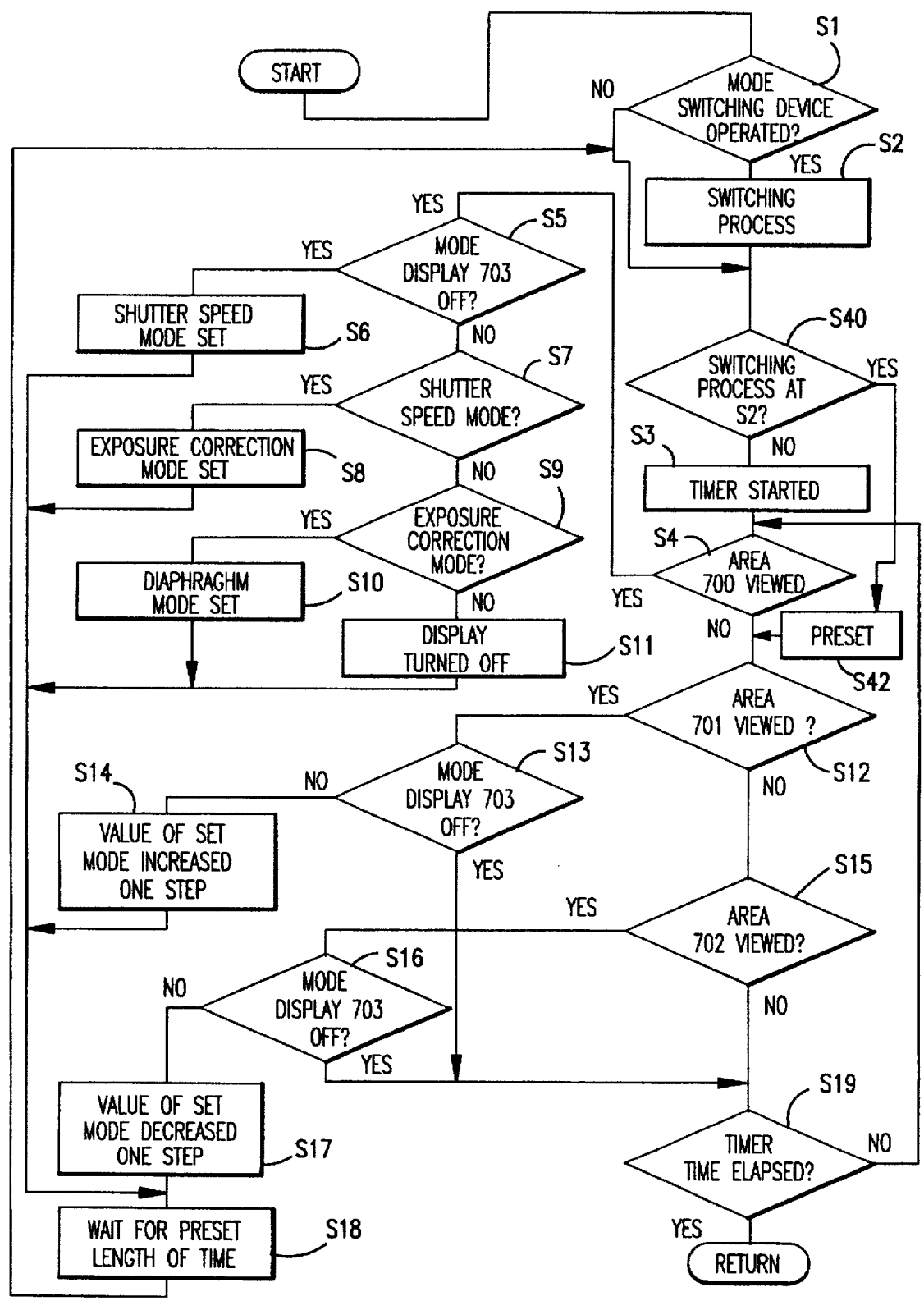
FIG. 12 is a procedural flowchart relating to the second embodiment of the present invention.

FIG. 12 is a flowchart showing a series of examples of processes of the CPU 601 in the present embodiment. The series of processes relating to the present embodiment are explained with reference to this flowchart.

It is assumed, in order to make the explanation more concise, with the present embodiment the shutter priority auto mode, the exposure compensation mode and the aperture priority mode shown in FIG. 11 are prepared as the camera modes that can be operated through visual alignment, and the symbols {T}, {F} and {±} are displayed as the mode display corresponding to the designation of each. In addition, changing of the mode contents will be either increasing or decreasing the set value.

Furthermore, the set value is increased through the operation of aligning vision on area 701, and the set value is decreased through the operation of aligning vision on area 702. Hence, in this embodiment, the manual operation for adjusting the set values is constituted by aligning vision on respective areas 701, 702.

In addition, normally (when the processes of the present embodiment are not accomplished), the operating mode set through the operation of visual alignment on area 700 changes in the order {shutter priority auto mode}, {exposure compensation mode} and {aperture priority auto mode}.

First, in step S1, the determination is made as to whether the mode switching member 615 has been operated, and when this member has been operated (YES n S1), the CPU moves to step S2, while when this member has not been operated (NO in S1), the CPU moves to step S40.

The process in step S2 is explained in detail with reference to FIG. 13, which is a block diagram including some of the components of FIG. 10. The camera modes that can be set through manual operation and the visual alignment operation are the shutter priority auto mode, the aperture priority auto mode and the exposure compensation mode. Mode contents of the shutter priority auto mode, the aperture priority auto mode and the exposure compensation mode means of the shutter speed value, the diaphragm stop and the exposure compensation value respectively can also be set.

Figure 13:
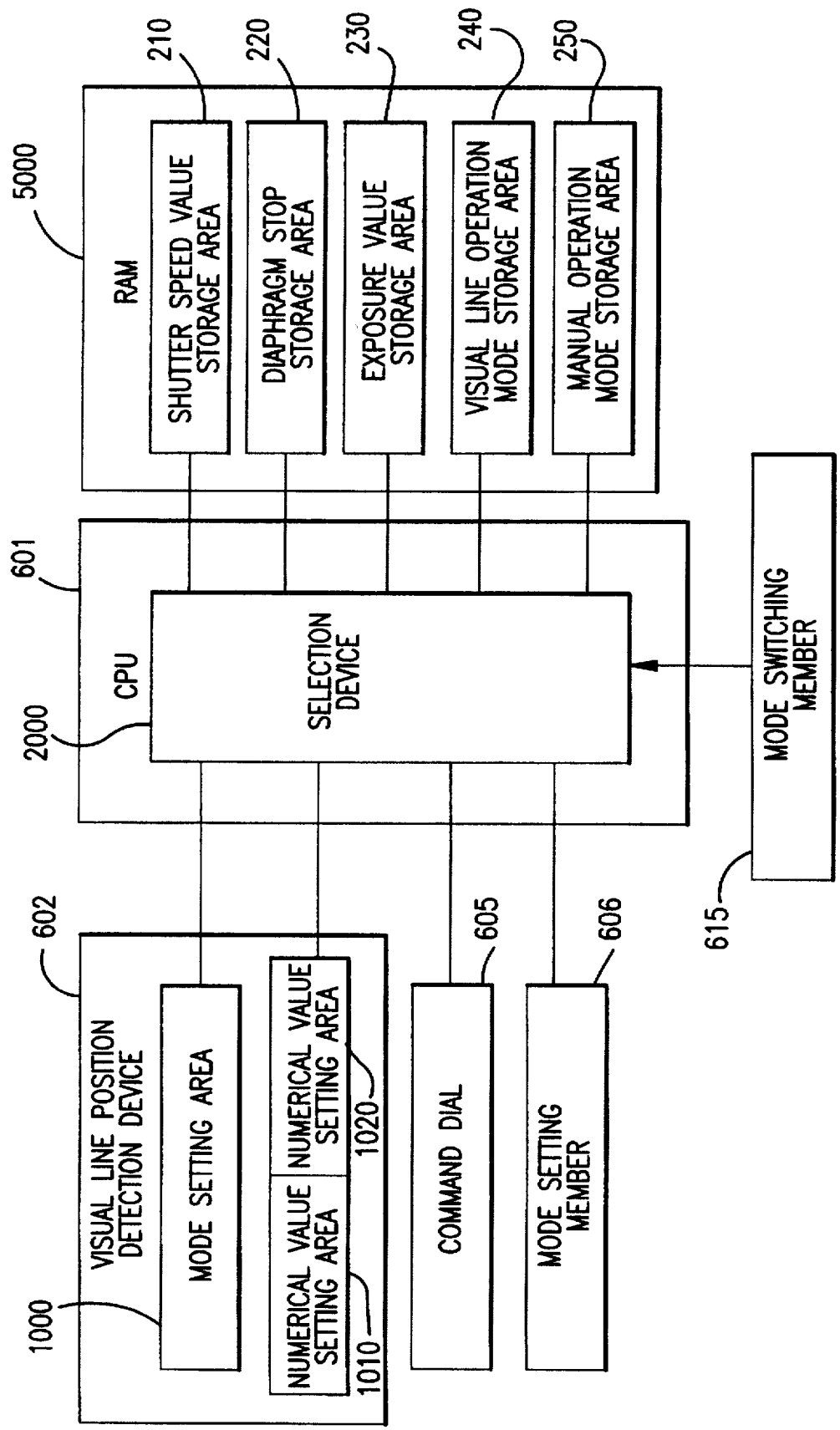
FIG. 13 is a block diagram showing various components of the second embodiment of the present invention.

Reference numbers 601, 602, 605, 606 and 615 in FIG. 13 are elements that are the same as those having the same reference numbers in FIG. 10. The mode setting area 1000 (corresponding to 700 in FIG. 11), which is used to set the operating mode through the visual alignment operation, numerical value setting areas 1010 (corresponding to 701 in FIG. 11, and being an area used to increase the setting value), and 1020 (corresponding to 702 in FIG. 11, and being an area used to decrease the setting value), which are used to set the contents of the mode through the operation are shown in FIG. 13 included in the visual line position detection device 602 to facilitate explanation.

The RAM 5000 is connected to the CPU 601, which is a control device, and is equipped at least with a shutter speed value storage area 210 that stores the shutter speed value, a diaphragm stop storage area 220 that stores the diaphragm stop, an exposure compensation value storage area 230 that stores the exposure compensation value, a visual line operation mode storage area 240 that stores the camera mode set through visual alignment on a mode setting area 1000, and a manual operation mode storage area 250 that stores the action mode set through manual operation of the mode setting means 606. Other necessary data is stored in other regions within the RAM 5000.

A selection device 2000, which is part of the CPU 601, is started through operation of the mode switching member 615 and accomplishes the preset processes discussed hereinafter.

The switching process, which is accomplished at step S2, will now be explained. This switching process can have various arrangements, and at step S2, it is appropriate to conduct any of the processes indicated hereinafter.

As a first process, a process is described wherein the camera mode set through manual operation using the above-described mode setting member 606 as the operating mode that is the object of contents changing through the action of visually aligning on the above-described numerical value setting area. In other words, this is a process wherein the camera mode that is the object of manual operation of the command dial 605 is set as the camera mode that is the object of the visual alignment action.

When the exposure compensation mode is set as the operating mode by the mode setting member 606, the selection device 2000 stores in the manual operation mode storage area 250 information indicating the exposure compensation mode. At this time, the exposure compensation value can be set with the command dial 605, and this value is stored in the exposure compensation value storage area 230.

On the other hand, when the shutter priority auto mode is selected as the operating mode through the operation of visually aligning on mode setting area 1000, the selection device 2000 stores in the visual line operation mode storage area 240 information indicating the shutter priority auto mode. At this time, the shutter speed value can be set through the operation of visually aligning on numerical value setting areas 1010 and 1020, and the resulting value is stored in the shutter speed value storage area 210.

When the mode switching member 615, the operation device, is operated under these conditions, the selection device 2000 automatically accomplishes the first process wherein reference is made to the contents of the manual operation mode storage area 250, and the exposure compensation mode is set as the object of the visual alignment operation.

At this time, information indicating the exposure compensation mode is stored in the visual line operation mode storage area 240.

In other words, the mode becomes such that the exposure compensation value can be increased or decreased through visual alignment on the numerical value setting areas 1010 and 1020. Because the exposure compensation value immediately prior to switching is stored in the exposure compensation value storage area 230, changing of the exposure compensation value is accomplished continuously through the visual alignment operation, and the changed value is then stored in the exposure compensation value storage area 230.

A second process is a process wherein the camera mode that is the object of contents changing through manual operation of the command dial 605 and the camera mode that is the object of contents changing through visual alignment on the numerical value setting areas 1010 and 1020 are switched.

When the exposure compensation mode is set as the operating mode with the mode setting member 606, the selection device 2000 stores information indicating the exposure compensation mode in the manual operation mode storage area 250. At this time, the exposure compensation value can be changed with the command dial 605, and the resulting value is stored in the exposure compensation storage area 230.

On the other hand, when the shutter priority auto mode is selected as the operating mode through the operation of visually aligning on mode setting area 1000, the selection device 2000 stores in the visual line operation mode storage area 240 information indicating the shutter priority auto mode. At this time, the shutter speed value can be set through the operation of visually aligning on numerical value setting areas 1010 and 1020, and the resulting value is stored in the shutter speed value storage area 210.

When the operation device, the mode switching member 615, is operated under these conditions, the selection device 2000 automatically accomplishes the second process, a process wherein reference is made to the contents of the manual mode storage area 250, and the exposure compensation mode is set as the object of the visual alignment operation. As thus far described, the second process is similar to the first process.

However, in the second process, the selection device 2000 accomplishes a process wherein reference is also made to previously stored contents of the visual line operation mode storage area 240 so that the shutter priority auto mode is set as the object of manual operation. This will now be described in detail.

Prior to operation of the mode switching member 615, information indicating the exposure compensation mode is stored in the manual mode storage area 250, and in addition, information indicating the shutter speed mode is stored in the visual line operation mode storage area 240.

Furthermore, when the mode switching device 615 is operated, the selection device 2000 stores the information indicating the shutter priority auto mode, which is stored in the visual line operation mode storage area 240, in a preset area within the RAM.

Next, the selection device 2000 refers to the contents of the manual mode storage area 250 and accomplishes a process wherein the exposure compensation mode is set as the object of the visual alignment operation. At this time, information indicating the exposure compensation mode is stored in the visual line operation mode storage area 240.

By this means, increasing and decreasing of the exposure compensation value becomes possible through visual alignment on numerical value setting areas 1010 and 1020. The exposure compensation value is then stored in the exposure value storage area 230.

Next, the selection device 2000 reads the contents of the above-described preset area within the RAM, and stores these contents in the manual mode storage area 250. By this means, the shutter priority auto mode becomes the object of manual operation, and setting of the shutter speed value becomes possible through manual operation of the command dial 605. The resulting value is then stored in the shutter speed value storage area 210.

Through the above, the second process, wherein the camera mode that is the object of contents setting and changing through manual operation of the command dial and the camera mode that is the object of contents setting and changing through the visual alignment operation of preset areas are switched, is concluded.

As noted above, it is appropriate to conduct either of the above-described processes at the {switching process} step S2, and in addition, the above-described processes are merely one or two examples of possible switching processes.

Next, in step S40, the determination is made as to whether a switching process was accomplished in step S2. It is preferable for the CPU 601 to make a flag in a preset region of the RAM when a switching process has been accomplished in step S2, and to make the determination of whether a switching process has been accomplished by referring to this flag information. This flag is then reset after being referenced.

Now, when a switching process has not been accomplished (NO in S40), the CPU moves to step S3 and accomplishes a process wherein the camera operations are performed with normal visual line operations.

On the other hand, when a switching process has been accomplished (YES in S40), the CPU moves to step S42 and accomplishes a preset process. This preset process performs, for example, a mode display corresponding to the action mode that is the new object of the visual alignment operation. In other words, if the switch is made to the shutter priority auto mode, for example, a {T} display is made. Furthermore, the up display area 704 "▲" and the down display area 705 "▼" are illuminated.

The CPU advances to a process wherein changing of the contents of the shutter priority auto mode, in other words the shutter speed value, is accomplished through visual alignment on area 701 and area 702.

Next, in step S3, a timer, which has the function of detecting when a preset length of time has elapsed, is started, and the CPU moves to step S4. This timer is a timer that is used to conclude the program when the photographer does not visually align on area 700, area 701 or area 702 within the preset length of time. The timer can be realized by making the CPU 601 such that a preset process (for example, the process of incrementing the value in a register until it reaches a preset value) is accomplished for only a preset length of time. When this process is concluded, the determination is then made that the preset length of time has elapsed.

In step S4, the determination is made as to whether the photographer is aligning his vision on the area 700, and if this is so (YES in S4), the CPU moves to step S5, while if this is not so (NO in S4), the CPU moves to step S12.

In step S12, the determination is made as to whether the photographer is aligning his vision on area 101, and if this is so (YES in S12), the CPU moves to step S13, while if this is not so (NO in S12), the CPU moves to step S15.

Next, in step S13, the determination is made as to whether the mode display 703 is in an off state, and if the display is not off (NO in S13), the CPU moves to step S14, while if the display is off (YES in S14), the CPU moves to step S19.

In step S14, the setting value that is the contents of the action mode corresponding to area 700 is increased by one step, the contents of the operating display corresponding to the photograph information display component 706 are switched to the display contents of the value increased by one step, and the CPU then moves to step S18.

Here, the amount corresponding to one step can be set as a predetermined desired value through the program.

Next, in step S15, the determination is made as to whether the photographer is aligning his vision on area 702, and if this is so (YES in S15), the CPU moves to step S16, while if this is not so (NO in S15), the CPU moves to step S19.

In step S16, the determination is made as to whether the mode display 703 is in an off state, and if the display is not off (NO in S16), the CPU moves to step S17, while if the display is off (YES in S16), the CPU moves to step S19.

Next, in step S17, the setting value that is the contents of the camera mode corresponding to area 700 are decreased by one step, the contents of the operating display corresponding to the photograph information display component 706 are switched to the display contents of the value decreased by one step, and the CPU then moves to step S18.

In step S18, the CPU waits for a preset length of time so that the photographer can verify the display contents.

In step S19, the determination is made as to whether the timer indicates that the preset length of time has elapsed, and if this preset length of time has not elapsed (NO in step S19), the CPU returns to step S4, while if this preset length of time has elapsed (YES in step S19), the processes are concluded, and the CPU returns to the main process routine.

Next, the processes from step S5 on will be explained. The following processes are process steps for changing the operating mode setting and the contents of the set mode when the switching process in step S2 is not accomplished, in other words, in general through the visual alignment operation in a camera equipped with a visual line detection device.

First, in step S5, the determination is made as to whether the mode display 703 is in an off state, and if the display is off (YES in S5), the CPU moves to step S6, while if the display is not off (NO in S5), the CPU moves to step S7.

Next, in step S6, the shutter priority auto mode is set as the camera mode that is the object of the visual alignment operation, only a mark "T" is illuminated in the mode display component 703, and the up display component 704 "▲" and the down display component 105 "▼" are illuminated. The CPU then moves to step S18.

In step S7, the determination is made as to whether the camera mode that is the object of the visual alignment operation is the shutter priority auto mode, and if this is so (YES in S7), the CPU moves to step S8, while if this is not so (NO in S7), the CPU moves to step S9.

Next, in step S8, the exposure compensation mode is set as the camera mode that is the object of the visual alignment operation, only a mark "F" is illuminated in the mode display component 703, and the up display component 704 "▲" and the down display component 705 "▼" are illuminated. The CPU then moves to step S18.

Next, in step S9, the determination is made as to whether the camera mode that is the object of the visual alignment operation is the exposure compensation mode, and if this is so (YES in S9), the CPU moves to step S10, while if this is not so (NO in S9), the CPU moves to step S11.

Next, in step S10, the aperture mode is set as the camera mode that is the object of the visual alignment operation, a mark "{±}" is illuminated in the mode display component 703, and the up display component 704 "▲" and the down display component 705 "▼" are illuminated. The CPU then moves to step S18.

In step S11, the mode display component 703, the up display component 704 and the down display component 705 are all turned off, and the CPU moves to step S18.

The processes of the present invention are preferably accomplished as described above, but the above-described flowchart is but a single example.

The present invention is also effective when applied, for example, to operation of an automatic focus camera having a multiple point distance measuring function that measures the distance to the subject in a plurality of regions in the photo field. In this camera, two types of area are provided beforehand in the viewfinder, for example.

Furthermore, the configuration is such that an auto focus mode is selected when visual alignment is on a first area, and a region selection is accomplished when visual alignment is on a second area because it is necessary to use distance measurement data corresponding to one region out of the plurality of regions in the photo field as the distance measurement data when starting automatic focussing. Specifically, it is preferable to have a configuration such that a single region is selected in order from the plurality of regions through visual alignment on the second area for a preset length of time.

It is preferable to have a configuration such that when the photographer has selected a region, the selected region can be readily understood through a mark {±} displayed in the region. The display of this mark can be realized through a liquid crystal display device or the like.

Now, suppose that when the automatic focus mode is set by the mode setting member 606, the subject moves so that the subject has moved from the center of the viewfinder. When a release occurs in this state, the automatic focus function is started in a state wherein the focus on the subject does not coincide with the desires of the photographer.

In this kind of case, the camera mode that is the object of the visual alignment operation becomes the automatic focus mode through operation of the mode switching member 615. Furthermore, the region where the targeted subject exists is selected through the operation of visually aligning on the above-described second area, and by this means it becomes possible to take photographs according to the desires of the photographer. Naturally, it is possible to conduct this series of operations without looking away from the viewfinder, making it possible to select with accuracy the region where the targeted subject exists, thereby preventing the missing of shutter opportunities.

In this way, the present invention improves ease of operation in various camera operations.

With the present invention as described above, in the state in which the photographer has not looked away from the viewfinder while placing his hand lightly on the release operation member, in other words in the state immediately prior to a release operation, it is possible for the shutter speed, the exposure compensation value and the diaphragm stop to be changed to the desired value without looking away from the viewfinder by simply operating the mode switching member (the mode switching member is placed in a position where operation is sufficiently easy even without the photographer looking away from the viewfinder, and this operation is also a simple operation such as applying pressure). Accordingly, release timing is not hindered.

In addition, when the photographer is in a state concentrating on the framing, the shutter speed, exposure compensation value and diaphragm stop can be slightly adjusted by the photographer merely by changing his primary visual line, and as a result, operation is easy.

As explained above, with the present invention, the photographer can set the contents of the desired action mode at the desired time through a visual alignment operation without looking away from the viewfinder, and because of this, shutter opportunities are not missed, and photographs can be taken according to the desires of the photographer.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera including a plurality of camera modes, said camera comprising:

a mode contents setting device that adjusts values of contents corresponding to an initially selected first camera mode through a manual operation of said mode contents setting device;

a visual line position detection device that detects a photographer visual line position; and a control device that changes the contents whose values are adjusted by the mode contents setting device from contents corresponding to said first camera mode to contents corresponding to a second camera mode when said visual line position detection device detects that the photographer visual line position is at a fixed area.

2. A camera according to claim 1, further comprising a display device that displays graphic representations of an operating mode and contents corresponding to said operating mode adjacent said fixed area.

3. A camera according to claim 1, further comprising a mode setting device that initially sets an operating mode of said camera to said first camera mode.

4. A camera according to claim 1, wherein said fixed area is a first fixed area, said camera further comprising a second fixed area, wherein said mode contents setting device adjusts values of the contents corresponding to a selected one of said first and second camera modes when said detection means detects that the photographer visual line position is at said second fixed area.

5. A camera including a plurality of camera modes, said camera comprising:

a mode setting device that selects one of said camera modes as a first operating mode;

a mode contents setting device that adjusts values of contents corresponding to said first operating mode through a first manual operation of said mode contents setting device;

a visual line position detection device that detects a photographer visual line position;

a processing device that activates a second camera mode as a second operating mode when said visual line position detection device detects said visual line position is at a first fixed area, said processing device adjusting values of contents corresponding to said second operating mode when said visual line position detection device detects said visual line position is at a second fixed area; and an operation device that substitutes said first operating mode for said second operating mode for activation and adjustment of values of contents by said processing device through a second manual operation.

6. A camera according to claim 5, wherein said mode values of contents setting device adjusts the contents corresponding to said first operating mode after operation of said operation device.

7. A camera according to claim 5, wherein said mode contents setting device adjusts values of the contents of corresponding to said second operating mode after operation of said operation device.

8. A camera according to claim 7, further comprising a memory device that stores said contents corresponding to said first operating mode and values of said contents, wherein said processing device adjusts the values of contents corresponding to said first operating mode from said stored values of contents after operation of said operation device.

9. A camera including a plurality of camera modes, said camera comprising:

mode contents setting means for adjusting values of contents corresponding to an initially selected first camera mode through a manual operation of said mode contents setting means;

detecting means for detecting a photographer visual line position; and control means for changing the contents whose values are adjusted by the mode contents setting means when said detecting means detects the visual line position is at said fixed area.

10. A camera according to claim 9, further comprising means for displaying graphic representations of an operating mode and contents corresponding to said operating mode adjacent said fixed area.

11. A camera according to claim 9, said camera further comprising means for initially setting an operating mode of said camera to said first camera mode.

12. A camera according to claim 9, wherein said fixed area is a first fixed area, said camera further comprising a second fixed area, wherein said mode contents setting means adjusts values of the contents corresponding to said first camera mode when said detection means detects that the photographer visual line position is at said second fixed area.

13. A camera including a plurality of camera modes, said camera comprising:

mode setting means for selecting one of said camera modes as a first operating mode;

contents setting means for adjusting values of contents corresponding to said first operating mode through a first manual operation of said contents setting means;

detecting means for detecting when a photographer visual line position is at a first fixed area and when the photographer visual line position is at a second fixed area;

processing means for activating a second camera mode as a second operating mode when said detecting means detects that said photographer visual line position is at said first fixed area and for adjusting values of the contents corresponding to said second operating mode when said detecting means detects said photographer visual line position is at said second fixed area; and operation means for automatically substituting said first operating mode for said second operating mode for activation and for adjusting of values of contents by said processing means through a second manual operation.

14. A camera according to claim 13, wherein said mode contents setting means comprises means for adjusting values of the contents corresponding to said first operating mode after operation of said operation means.

15. A camera according to claim 13, wherein said mode contents setting means comprises means for adjusting values of the contents corresponding to said second operating mode after operation of said operation means.

16. A camera according to claim 9, further comprising a memory device that stores said contents corresponding to said first operating mode and values of said contents, wherein said processing device adjusts values of contents corresponding to said first operating mode from said stored values of contents after operation of said operation device.

17. A method of operating a camera including a plurality of camera modes, said method comprising the following steps:

adjusting contents corresponding to a first camera mode through a manual operation;

detecting a photographer visual line position; and changing the contents to be adjusted from contents corresponding to said first camera mode to contents corresponding to a second camera mode when said visual line position detection device detects the visual line position is at a fixed area.

18. A method according to claim 17, said method further comprising the step of displaying graphic representations of an operating mode and contents corresponding to said operating mode adjacent said fixed area.

19. A method according to claim 17, said method further comprising the step of initially setting an operating mode to said first camera mode.

20. A method according to claim 17, wherein said manual operation comprises rotating a command dial.

21. A method according to claim 17, wherein said manual operation comprises aligning a photographer visual line position at said fixed area.

22. A method according to claim 17, wherein said fixed area is a first fixed area, said camera further comprising a second fixed area, further comprising the step of adjusting values of the contents corresponding to a selected one of said first and second camera modes by the photographer aligning his visual line position at said second fixed area.

23. A method of operating a camera including a plurality of camera modes, said method comprising the following steps:

selecting one of said camera modes as a first operating mode;

adjusting values of contents corresponding to a first camera mode through a first manual operation;

detecting a photographer visual line position;

activating a second camera mode as a second operating mode when said photographer visual line position is detected at a first fixed area;

adjusting values of the contents corresponding to said second operating mode when said visual line position is detected at said second fixed area; and substituting said first operating mode for said second operating mode for activation and for adjustment of values of contents through a second manual operation.

24. A method according to claim 23, further comprising the step of adjusting values of the contents corresponding to said first operating mode by said first manual operation after completion of said substituting step.

25. A method according to claim 23, further comprising the step of adjusting values of the contents corresponding to said second operating mode by said first manual operation after completion of said substituting step.

26. A method according to claim 25, further comprising the step of, after completion of said substituting step, adjusting values of the contents corresponding to said second operating mode from stored values of the contents corresponding to said second operating mode by detecting said photographer visual line position at said second fixed area.

27. A method according to claim 23, wherein said manual operation comprises aligning a photographer visual line position at one of said first and second fixed areas.

* * * * *